Jan. 27, 1931.  C. LENGYEL  1,789,982
CATERING EQUIPMENT FOR MOTOR CARS
Filed Nov. 18, 1929  6 Sheets-Sheet 1
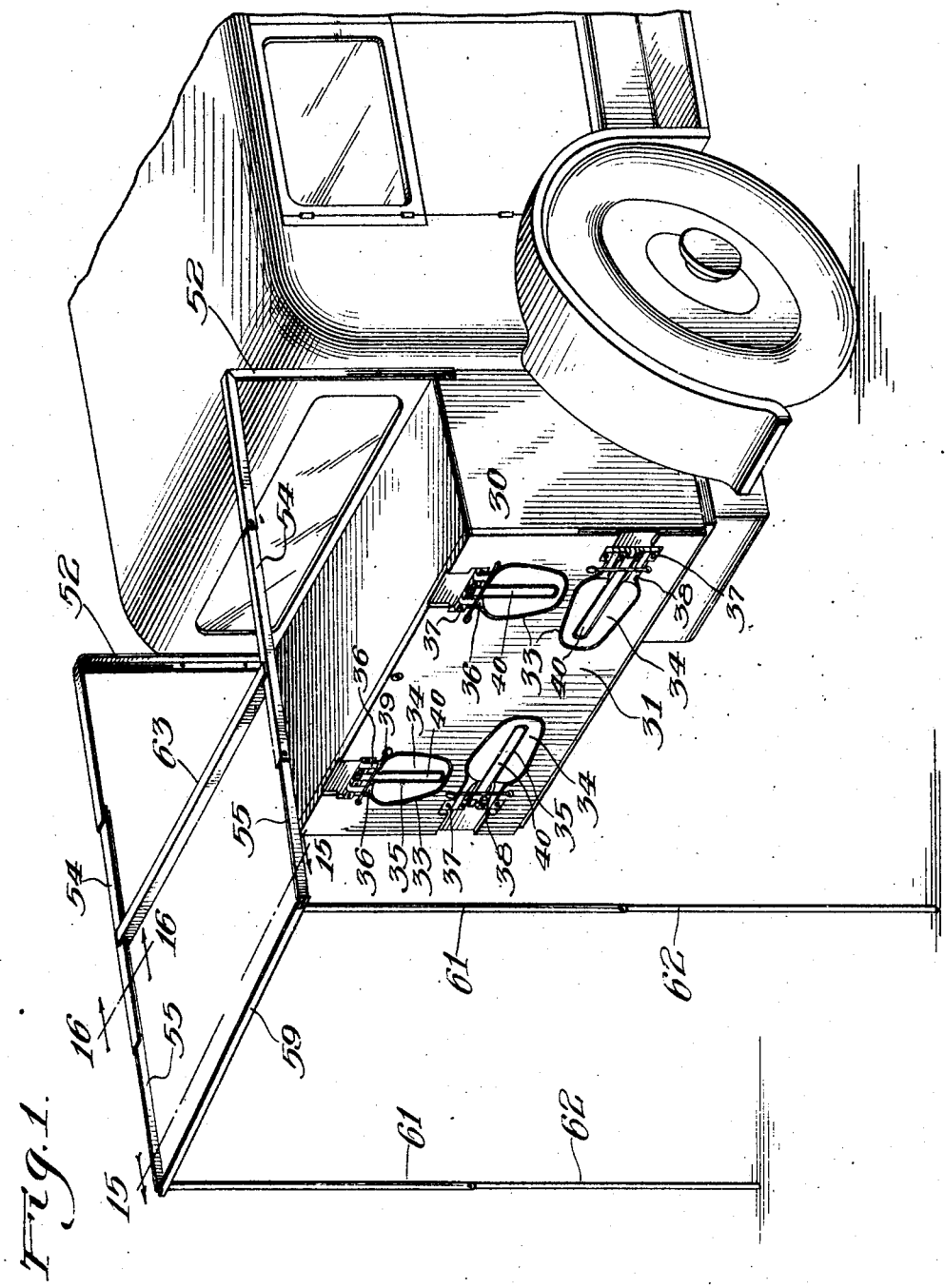
Inventor:
Coloman Lengyel,
By Benj. J. Roodhouse, Atty.

Jan. 27, 1931.  C. LENGYEL  1,789,982
CATERING EQUIPMENT FOR MOTOR CARS
Filed Nov. 18, 1929  6 Sheets-Sheet 2
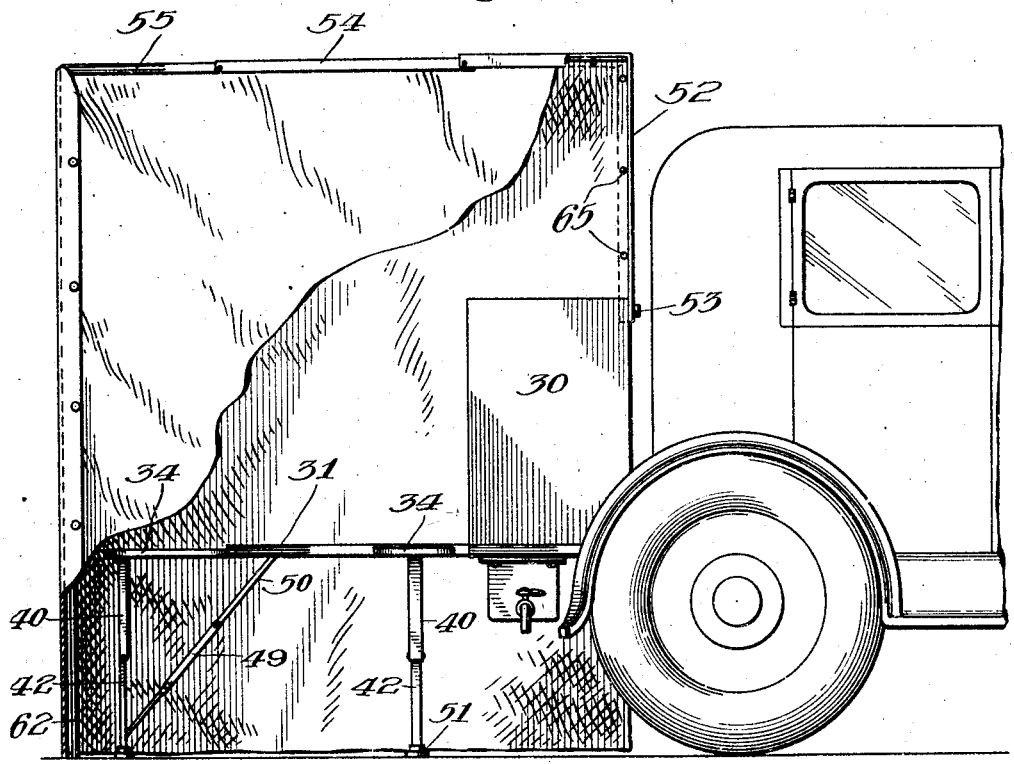
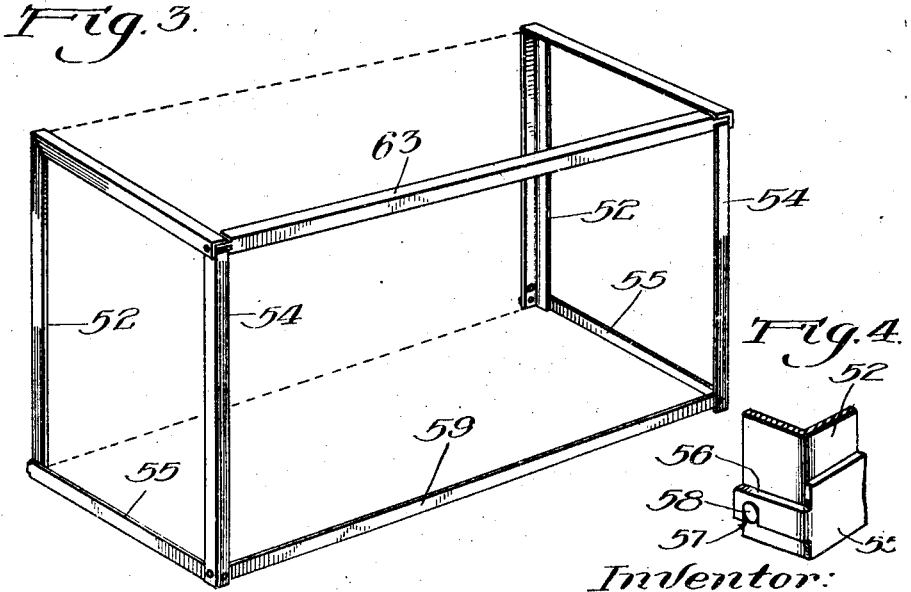
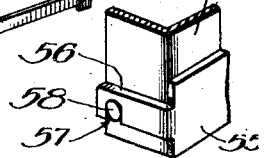
Inventor:
Coloman Lengyel, Jan. 27, 1931.  C. LENGYEL  1,789,982
CATERING EQUIPMENT FOR MOTOR CARS
Filed Nov. 18, 1929   6 Sheets-Sheet 3

Inventor:
Coloman Lengyel
By
Benj. J. Roadhouse Atty.

Jan. 27, 1931.  C. LENGYEL  1,789,982
CATERING EQUIPMENT FOR MOTOR CARS
Filed Nov. 18, 1929    6 Sheets-Sheet 4
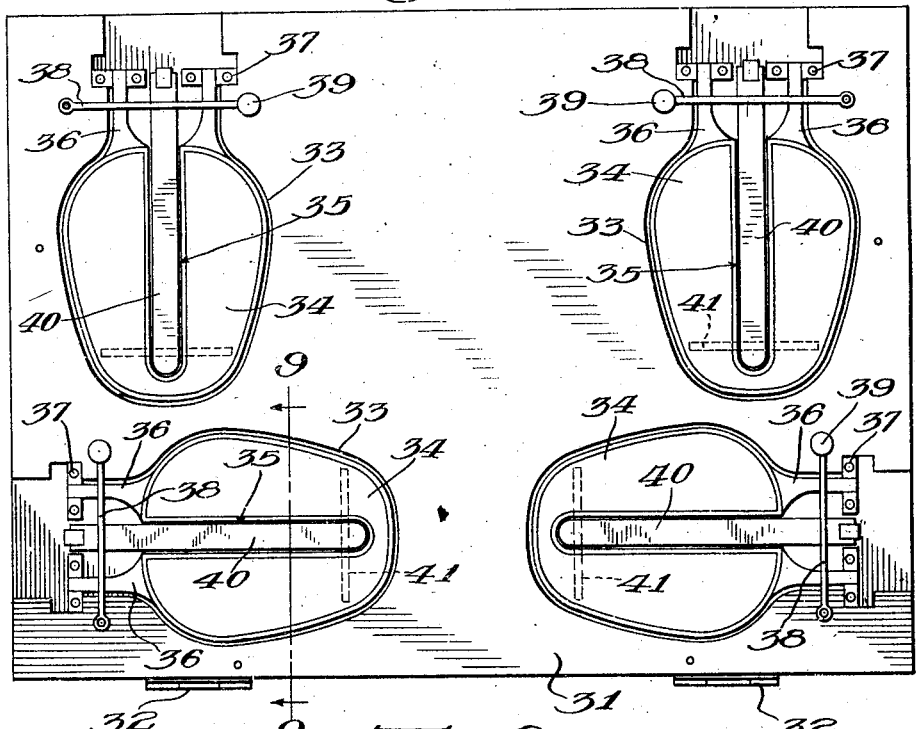
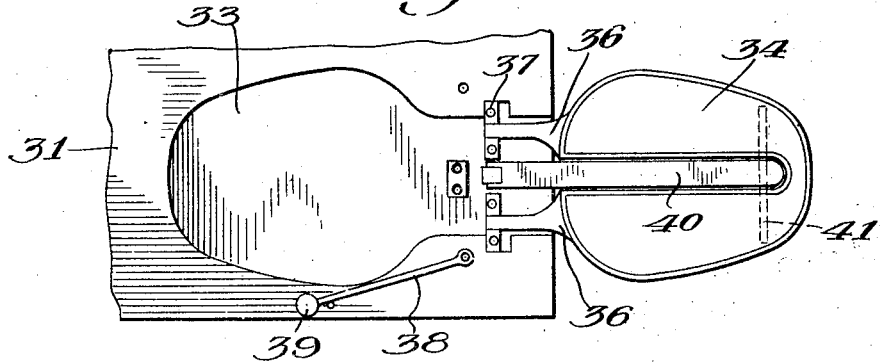
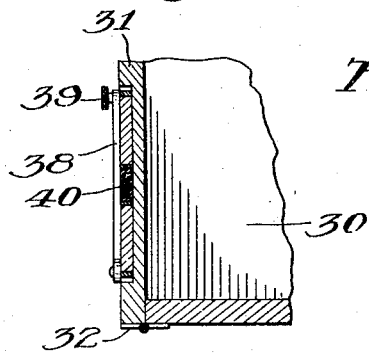
Inventor:
Coloman Lengyel,
By

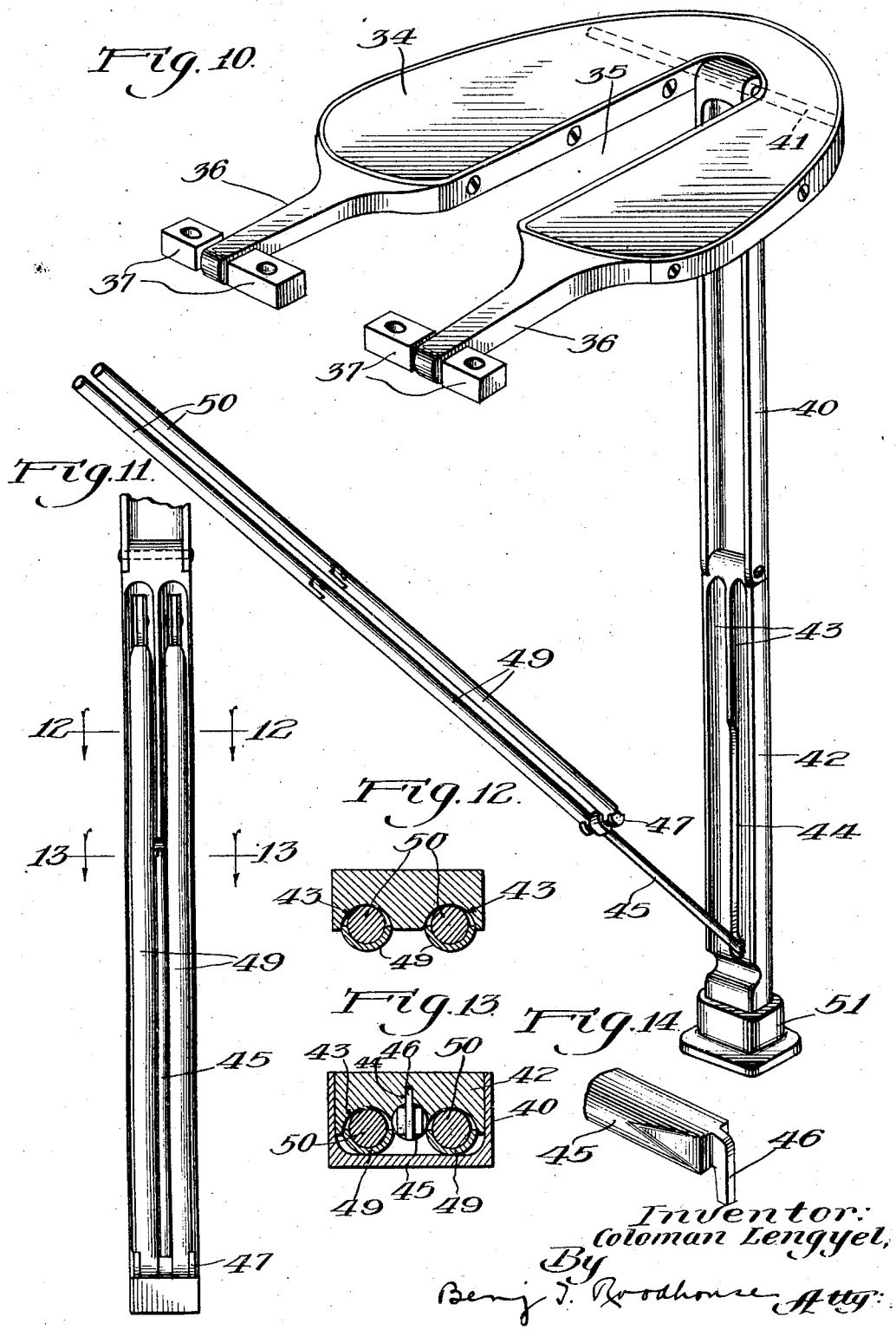

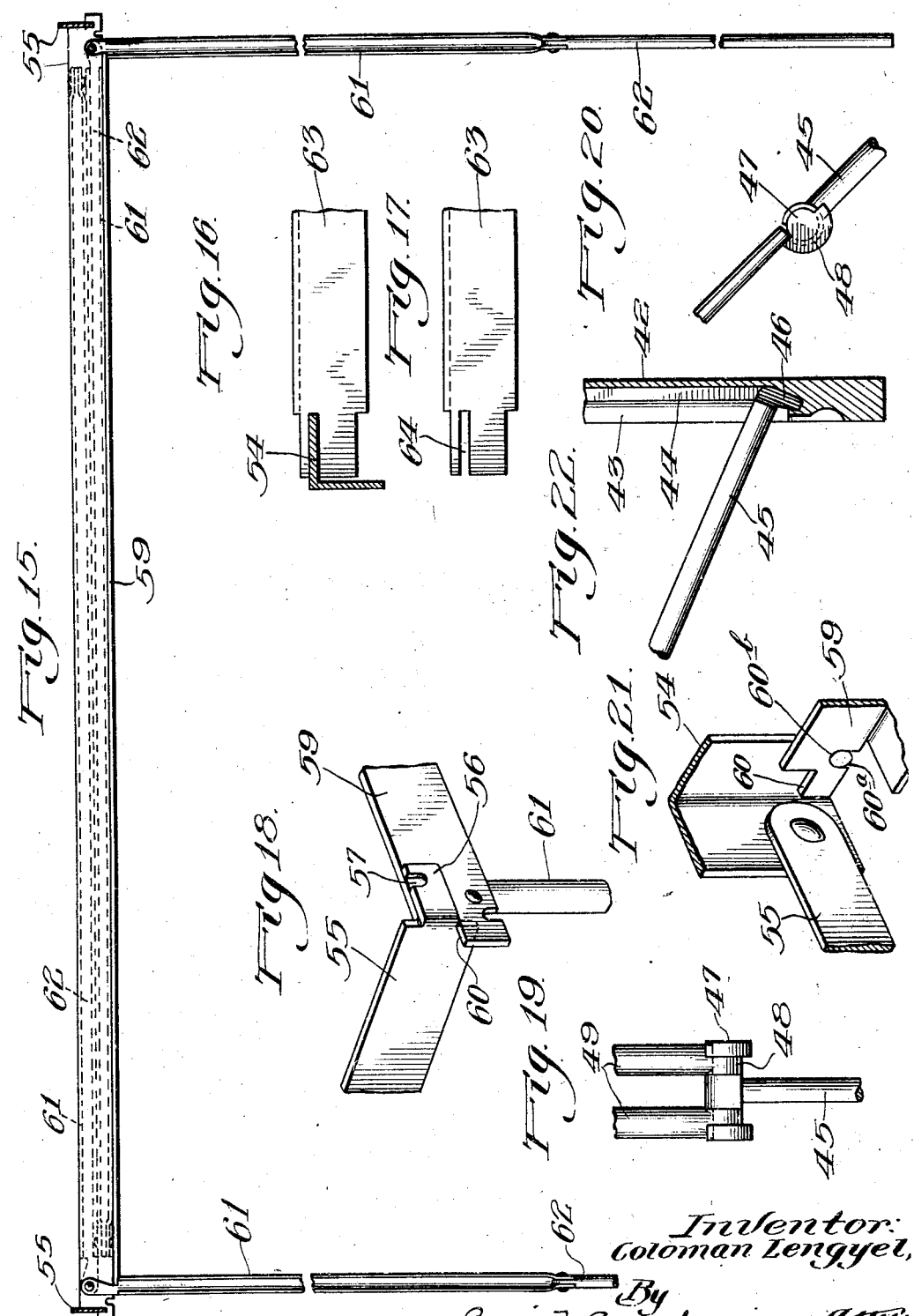

Patented Jan. 27, 1931

1,789,982

UNITED STATES PATENT OFFICE

COLOMAN LENGYEL, OF CHICAGO, ILLINOIS

CATERING EQUIPMENT FOR MOTOR CARS

Application filed November 18, 1929. Serial No. 407,915.

My present invention relates to the provision of catering equipment for motor cars, and comprises, in connection with a container for food and utensils which may be carried on the same facilities on which automobile trunks are usually carried, a table and seats and a foldable frame work for supporting a tenting element to enclose the entire set up.

While automobile picnicking is a healthful and diverting activity, every one who has experience in automobile picnicking knows the difficulty, and very often the impossibility, of finding a convenient location for the picnic.

As will hereafter be seen, I provide, in connection with a container for the food and utensils, a convenient table for the repast and seating arrangements and shelter so that the picnicking can be accomplished easily and conveniently at any point where it is possible to draw off of the highway.

I accomplish the foregoing objects by means of the structures and arrangements illustrated in the accompanying drawing in which—

Fig. 1 is a fragmental view of a motor car with the container or receptacle in position thereon and the tent frame work extended to receive the tenting.

Fig. 2 is a side elevation of the construction shown in Fig. 1 with the table and seats extended and the tenting in place, a portion of the tenting being broken away to disclose the table and seats.

Fig. 3 is an illustration of the tent holding frame work in folded position to enclose the food and equipment container or receptacle.

Fig. 4 is a fragmental detail of the lower inner assembly of the tent frame in folded position.

Fig. 7 is a view of the closure for the container or receptacle which in open position forms a table with the seats attached thereto in folded position.

Fig. 8 is a fragmental view of the table with a seat in unfolded position but before the leg and brace are unfolded.

Fig. 9 is a section on line 9—9 of Fig. 7.

Fig. 10 is a perspective of a seat detached from the table with leg and brace extended.

Fig. 11 is an inside view of the lower leg member with the brace folded therein.

Fig. 12 is a section on line 12—12 of Fig. 11.

Fig. 13 is a section on line 13—13 of Fig. 11.

Fig. 14 is a fragmental perspective of the lower end of the brace member.

Fig. 15 is a sectional detail on line 15—15 of Fig. 1 of the rear top cross member of the tent frame with the standards attached, the manner in which the standards are folded within the cross member being shown in dotted lines.

Fig. 16 is a section on line 16—16 of Fig. 1.

Fig. 17 is a fragmental detail of the end of the slidable cross rail without the end rail with which it assembles.

Fig. 18 is a fragmental detail showing the assembly of a side rail, an end rail and leg of the tent frame.

Fig. 19 is a fragmental detail of the lower joint of the seat brace.

Fig. 20 is a side view of the construction shown in Fig. 19.

Fig. 21 is a fragmental detail of the assembly of a front lower corner of the tent frame in folded position.

Fig. 22 is a fragmental detail of the assembly between the lower section of the seat leg and the seat brace.

Similar reference characters refer to similar parts throughout the respective views.

Figure 5:
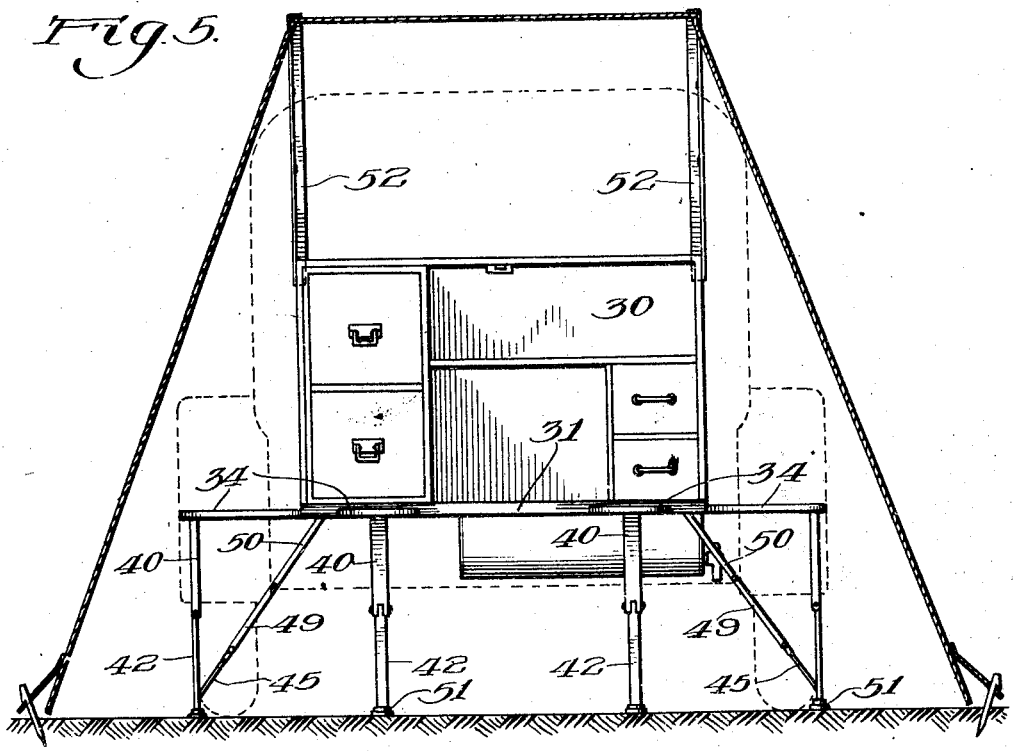
Fig. 5 is an end elevation of the structure shown in Fig. 2, the tenting being guyed out for securing additional room.

The container or receptacle 30 is similar in size and shape to an ordinary automobile trunk and may be secured to the means provided on automobiles for carrying such trunks. These means are not illustrated as they constitute no portion of my present invention. The rear side 31 of the container or receptacle opens out or swings downwardly therefrom upon hinges 32, as shown most clearly in Fig. 7, to form, in its open position, a table, as shown most clearly in Figs. 2 and 5. The side or table 31 has some thickness, and in the outer face thereof, which forms the under side of the table in open position, are provided recesses 33 into which swing the seat members when in folded position. The seats 34 are of suitable outline and are provided with cutout portions 35 running from adjacent their rear edges for receiving the seat legs and braces when in folded position, as hereinafter described. From the bifurcated forward edge of the seat extend arms 36 pivoted between blocks 37 secured in the recesses 33. To maintain the seats in folded position within the recesses 33 I provide a pivoted swinging arm 38 having a thumb screw 39 on its detachable end, which may be swung to one side of the seat aperture 33, as shown in Fig. 8, to permit the seat to unfold, or be swung across a portion of the seat aperture, as shown in Fig. 7, to retain the seat therein.

The seat leg, as most clearly shown in Fig. 10, comprises an upper channeled member 40, one end whereof is pivoted by means of the rod 41 adjacent the inner closed end of the cut-out portion 35 of the seat, and a lower leg member 42 pivoted to the member 40 so as to fold therein, as shown in Fig. 13. The inner face of the member 42 is provided with longitudinal grooves 43 and a channel 44 to receive, in folded position, a leg brace to prevent the members of the leg from collapsing.

The leg brace, while being foldable and stowable within the leg members 40 and 42, when these members are in folded position, is detached from the leg and the table while it is being folded and opened. This brace comprises a lower single section 45 which has a laterally extending hook member 46 thereon which in extended position engages in an undercut portion of the slot 44, as most clearly shown in Fig. 22. The upper end of the member 45 is provided with a transverse rod 47 which forms a part of a knuckle joint 48, as most clearly shown in Figs. 19 and 20, with a pair of semi-tubular rods 49—49, the upper ends of which are somewhat flattened and are pivoted to rods 50—50 whereby the rods 50—50 fold within the members 49—49 and these folded members fit in the grooves 43, as shown in Fig. 12, and are enclosed within the channel of the channel member 40, as shown in Fig. 13. The upper end of the brace comprising the members 45, 49 and 50 when these members are in an extended position engages the inner edge of the recess 33, as shown in Fig. 5, to prevent collapsing of the seat leg. The lower end of the leg member 42 may be shod with a detachable rubber foot 51 if desired.

The tent frame comprises a pair of back vertical members 52—52 which are formed of angle iron, and the lower ends of which are detachably secured to the rear upper corners of the container or receptacle 30 by means of removable bolts 33, as shown in Fig. 2. The upper portions of the members 52 bend forwardly at right angles and to their forward ends are hinged lengths of angle iron 54 to the forward ends of which are hinged other lengths of strap metal 55.

The lengths of angle iron 54 lie adjacent the front corners of the receptacle 30 and the lengths of strap metal 55 lie along the bottoms of the sides of the receptacle when the tent frame is in folded position, as shown in Fig. 3. Tongues 56 are developed from the ends of the strap metal 55 which are bent at right angles and notched at 57 to engage a pin 58 provided in the rear face of the member 52, as shown in Fig. 4, to hold the members 52 and 55 in folded assembly. The tongue 56 also extends around the front upper cross bar 59 and rests in a notch 60 thereof when the frame is in open position, as shown most clearly in Fig. 18. The front upper cross bar 59 is entirely detachable and has pivoted thereto the upper standard members 61 which are semi-tubular in section and to the lower end of which are pivoted the lower standard members 62. The lower standard members fold within the upper standard members and these folded members fold adjacent the upper front cross bar 59 for stowage, as seen in Fig. 15. This member 59 and the standards which are attached thereto may be stowed between the lower ends of the angle pieces 54, as shown in Figs. 3, 6 and 21, and has provided adjacent but opposite to the notch 60 a recess 60a which assembles with a pin 60b provided on a flange of the members 54 when in folded position as most clearly shown in Fig. 21.

I provide additional cross brace member 63 which is made of angle metal, the vertical flange whereof at either end being somewhat cut away and notched, as at 64, as most clearly shown in Fig. 17, to receive the horizontal flange of the member 54 as the member 63 may be slid backwards and forwards along the top of the tent frame so as to bring the support where it is most needed in the particular case. The member 63 is conveniently stowed at the upper forward edge of the receptacle when in folded position, as shown most clearly in Figs. 3 and 6.

The tent frame may be provided with snap buttons 65 to engage with the tent structure, as shown in Fig. 2, or thrown over the tent frame and guyed down, as shown in Fig. 5.

Figure 6:
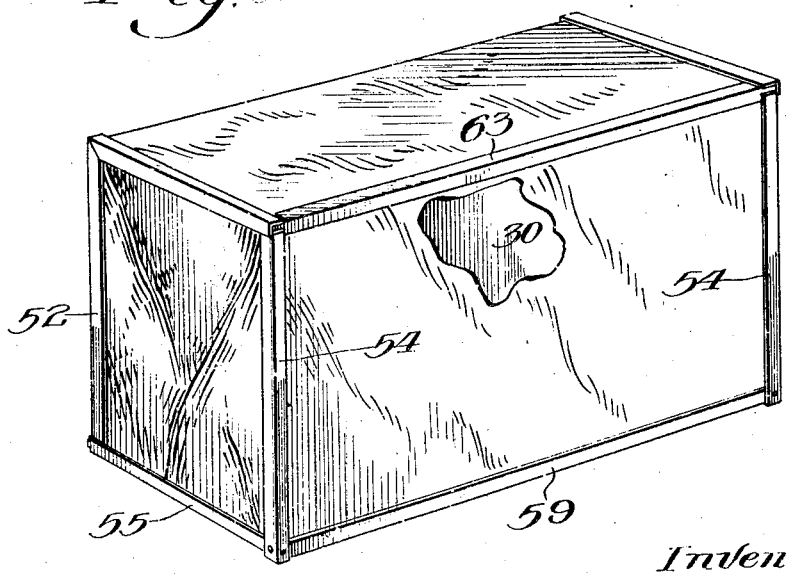
Fig. 6 illustrates the container or receptacle covered with tenting and surrounded by the tent frame.

The tent element may be easily folded and wrapped about the receptacle 30 before the tent frame is folded thereabout, as shown in Fig. 6. This arrangement will protect the receptacle from the entry of dust and the tent frame will secure the tent about the receptacle when so stowed.

Having described my invention what I claim is new and desire to secure by Letters Patent is:

1. Catering equipment for motor cars comprising, in combination with a receptacle for food and utensils, a side whereof is hinged to swing outwardly and downwardly, said side being provided with recesses, seats pivoted to swing into and out of said recesses and folded legs pivoted to their seats.

2. Catering equipment for motor cars comprising, in combination with a receptacle for food and utensils, a side whereof is hinged to swing outwardly and downwardly, said side being provided with recesses, seats having cut-out portions therein, legs pivoted into said cut-out portions and foldable into and out of said cut-out portions, said seats being foldable into and out of said recesses.

3. Catering equipment for motor cars comprising, in combination with a receptacle for food and utensils, a side whereof is hinged to swing outwardly and downwardly, said side being provided with recesses, seats pivoted to swing into and out of said recesses, said seats having cut-out portions therein and foldable legs pivoted within said recesses comprising a channel member and a member foldable therein.

4. Catering equipment for motor cars comprising, in combination with a receptacle for food and utensils, a side whereof is hinged to swing outwardly and downwardly, said side being provided with recesses, seats pivoted to swing into and out of said recesses, said seats having cut-out portions therein and foldable legs pivoted within said recesses comprising a channel member and a groove member foldable therein and a brace removably stowed within said groove and enclosed by said leg members in folded position.

COLOMAN LENGYEL.